United States Patent [19]

Houle

[11] 4,250,621
[45] Feb. 17, 1981

[54] SAFETY CUTTER BLADE FOR A ROTARY TRIMMER

[76] Inventor: Elmer R. Houle, 6040 N. 7th St., Ste. 101, Phoenix, Ariz. 85014

[21] Appl. No.: 66,091

[22] Filed: Aug. 13, 1979

Related U.S. Application Data

[63] Continuation of Ser. No. 919,164, Jun. 26, 1978, abandoned, Continuation-in-part of Ser. No. 833,229, Sep. 14, 1977, abandoned.

[51] Int. Cl.³ .......................................... A01D 55/00
[52] U.S. Cl. ....................................... 30/347; 56/295
[58] Field of Search .................. 56/295, 12.7; 30/276, 30/347, 206

[56] References Cited

U.S. PATENT DOCUMENTS

| | | | |
|---|---|---|---|
| 1,550,342 | 8/1925 | Cogley | 30/276 |
| 1,744,597 | 1/1930 | Vasconcellos | 56/295 |
| 2,427,265 | 9/1947 | Dreischerf | 30/206 |
| 3,087,298 | 4/1963 | Phillips | 56/295 |
| 3,781,991 | 1/1974 | Stretton | 30/347 X |
| 3,911,652 | 10/1975 | Houle | 56/295 |
| 3,975,891 | 8/1976 | Gunther | 56/295 |

*Primary Examiner*—Jimmy C. Peters
*Attorney, Agent, or Firm*—Don J. Flickinger

[57] ABSTRACT

A safety cutter blade for a rotary trimmer. The blade has a hub formed with a central opening for mounting it on the drive shaft of a rotary trimmer. Three equally angularly spaced cutting blades are formed integrally with the hub and extend outwardly from said hub. Each blade is formed with a convex rearwardly swept cutting edge which is tangential to the hub on one side of the cutting blade and a short straight forwardly swept cutting edge on the other side of each cutting blade. Either of these cutting edges is adapted to be the leading, or effective edge depending on the orientation of the blade on the drive shaft and the direction of rotation of the trimmer shaft. The safety blade is made of an elastomer reinforced with plastic fibers. A layer of coarse fabric made of threads of an organic polymer is embedded in the elastomer and intersects the cutting edges of the cutting blades.

14 Claims, 6 Drawing Figures

U.S. Patent  Feb. 17, 1981  4,250,621
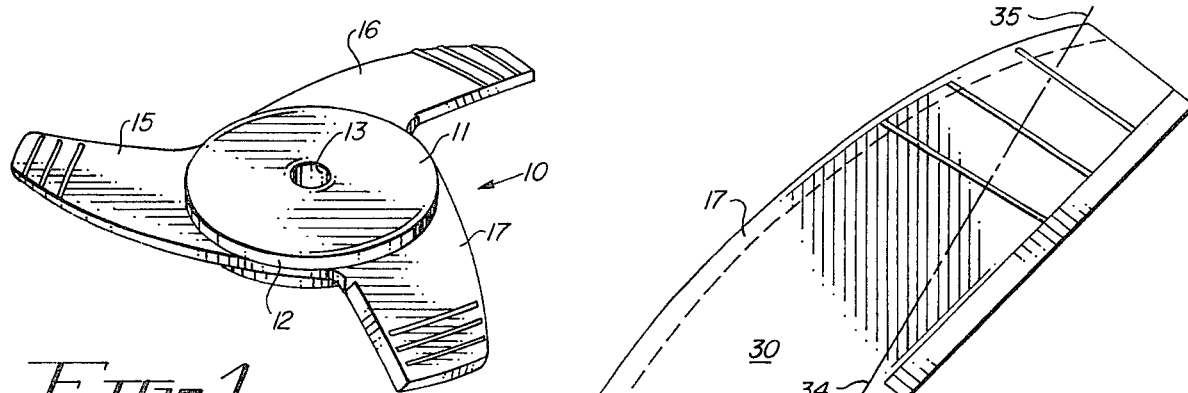
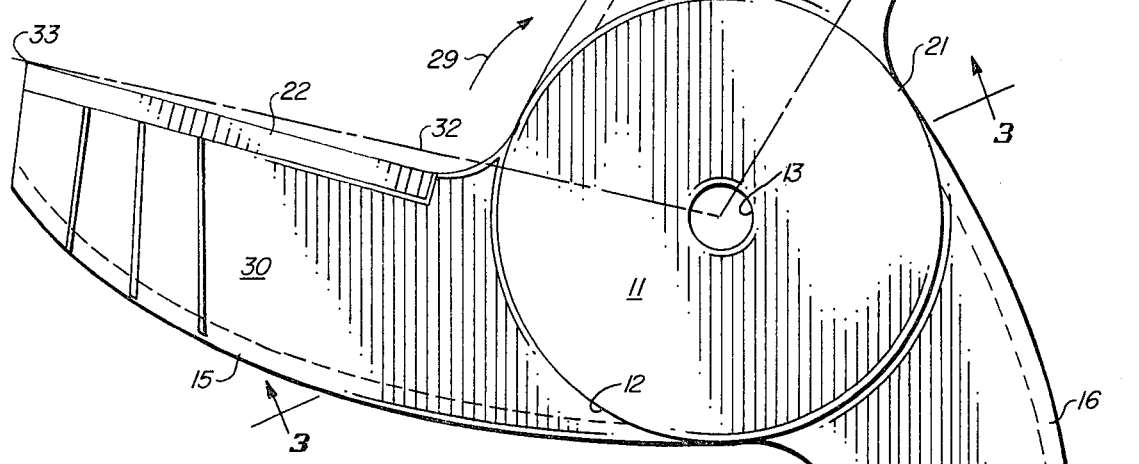
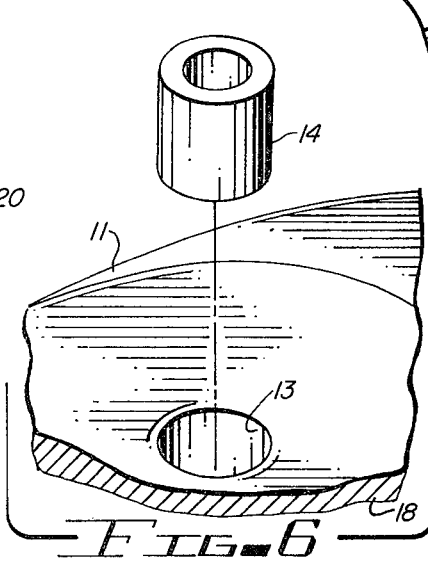
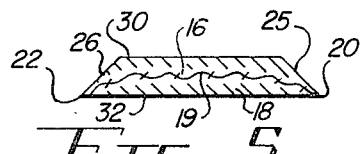
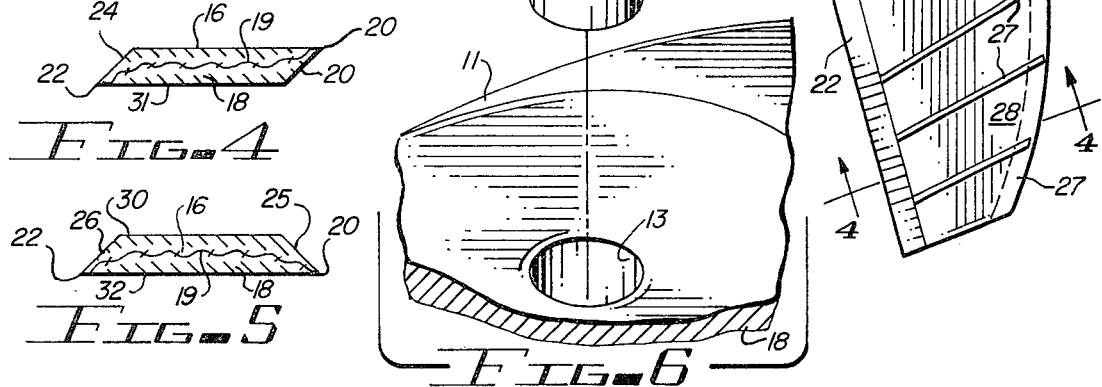

SAFETY CUTTER BLADE FOR A ROTARY TRIMMER

CROSS-REFERENCES TO RELATED APPLICATION

This application is a continuation of the co-pending application of Elmer R. Houle, Ser. No. 919,164 now abandoned filed June 26, 1978 which in turn was a continuation-in-part of the application of Elmer R. Houle, Ser. No. 833,229 now abandoned which was filed on Sept. 14, 1977.

BACKGROUND OF THE INVENTION (1) Field of the Invention

This invention relates to cutter blades for rotary trimmers, and more particularly to safety cutter blades made of materials which significantly reduce the risk of injury to operators of such devices and persons in the vicinity thereof.

(2) Background of the Invention

Rotary trimmers of the type with which the instant invention is adapted to be used may be classified in three categories. One is for cutting brush, or brush cutters; a second is for long grass or weeds; and the third is for short grass found in a lawn in positions which a conventional lawn mower cannot reach. The cutter blades of such trimmers are made of metal and thus present a hazard to operators of such devices as well as to people in the vicinity. The recognition of the risk associated with rotary powered mowers and cutting devices has led to the development of safety cutter blades primarily for such power lawn mowers. A problem with existing blade designs for rotary trimmers is that when used to cut high grass and weeds some such designs cause the long grass and weeds to become wound around the shafts rotating the blades which creates a sufficient drag to stall the motors of such trimmers. Blades which tend to prevent long grass and weeds from winding around the shaft are not as effective in cutting short grass when the trimmer is used to trim in places around the lawn which the conventional mower cannot reach.

To be economically successful, safety trimmer blades must have substantially the same or better performance and useful life as metal blades, be comparable in cost while retaining the safety features. Prior art safety trimmer blades have not been successful in satisfying completely these criteria.

SUMMARY OF THE INVENTION

The present invention provides a safety blade of a flexible elastomeric material such as rubber which may be reinforced by plastic fibers and which is provided with a layer of coarse fabric made of an organic polymer such as nylon. The blade has a hub in the form of a circular disk with a central aperture for mounting the hub on the drive shaft of a rotary trimmer. A bushing may be detachably positioned in this aperture to adapt the hub to fit on drive shafts of different dimensions. Integral with and extending outwardly from the hub and co-planer therewith are three cutting blades equally angularly spaced apart. Each of these cutting blades has a comparatively long convex swept cutting edge on one side, the inner end portion of the convex cutting edge being tangential with the hub. The swept cutting edge is intended to operate on long grass or weeds with a negative cutting action by applying a force to the severed portions which throws foliage outwardly and away from the drive shaft of the trimmer. A relatively short straight swept forward cutting edge is formed on the opposite side of the cutting blades. The straight cutting edge functions with a positive cutting action on short grass such as is ordinarily found on lawns by applying a force to the severed portions directed inwardly. Such a blade cuts short grass better, more evenly, and the short length of the grass will not collect on the drive shaft of the trimmer and create sufficient drag or load to stall the engine. The coarse fiber is positioned in the blades so that the fabric intersects the cutting edges of each cutting blade or forms a cutting edge. The area of the fabric is substantially equal to or co-extensive with, that of the blades.

Both of the cutting edges of a cutting blade take the form of bevelled surfaces on opposite sides of the cutting blade. In one embodiment, these bevelled surfaces are substantially parallel to each other while in another species they converge to define a substantially frusto-conical blade. Each blade has spaced parallel lines in the region adjacent to its outer end to define sections which may be cut off to achieve a required length of the blades. From the foregoing, the present invention has the following objectives:

1. To provide a safety blade for a rotary trimmer comprising a circular hub, from which outstand a plurality of cutting blades which are integral with the hub, with each blade having cutting edges on opposite sides thereof, with the cutting edges formed of a coarse layer of fabric embedded in the elastomeric material from which the blades are formed; either of the cutting edges may be the leading edge when the blade is mounted on the drive shaft of a rotary trimmer and in which the cutting edge on one side is designed to perform one cutting function and the cutting edge on the opposite side of each cutting blade is designed to carry out a different cutting action;

2. To provide, in a safety blade of the type noted, a plurality of cutting blades each of which has a comparatively long cutting edge curved in the cutting plane defined by the cutting edge on one side of each cutting plane and a relatively short straight cutting edge on the opposite side thereof;

3. To provide, in a safety blade of the character aforesaid, three cutting blades, equally angulared spaced apart and each cutting blade of which has bevelled edges on opposite sides constituting cutting edges with a layer of coarse fabric embedded in each cutting blade and intersecting the cutting edges of each cutting blade;

4. To provide, in a safety blade of the kind described, cutting blades having swept convexed cutting edges, the inner ends of which are tangential to the circular hub;

5. To provide, in a safety blade of the type noted, a hub having a central aperture in a bushing position and said aperture, whereby the hub is adapted to be mounted on the drive shafts of rotary trimmers of different diameters;

6. To provide, in a safety blade of the character aforesaid, a hub and a plurality of cutting blades outstanding therefrom, which are made of a flexible elastomeric material and with a coarse fabric made of an organic polymer embedded therein and co-extensive with the area of the blade.

7. To provide, in a safety blade of the kind described, a plurality of cutting blades, each of which has lines in parallel spaced relation along its outer end portion, which facilitate cutting off a portion of the blade to achieve a required length.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

FIG. 1 is a perspective of a safety blade for a rotary trimmer embodying the precepts of the present invention;

FIG. 2 is a plane view taken on a larger scale of the blade;

FIG. 3 is a section taken about on the plane of the lines 3—3 of FIG. 2;

FIG. 4 is a transverse section through the end of a cutting blade being taken about on the plane of line 4—4 of FIG. 2;

FIG. 5 is a sectional view similar to FIG. 4 of a modified cutting blade structure; and FIG. 6 is an enlarged perspective partially broken away depicting a portion of the hub and the bushing which is removably positioned relative thereto in exploded relation.

DETAILED DESCRIPTION OF THE INVENTION

Referring now to the drawing, wherein like reference characters represent corresponding parts and first, more particularly to FIGS. 1 and 2, a safety blade made on principles of this invention is identified in its entirety by the reference character 10. Blade 10 includes a hub 11 in the form of a central disk or cylinder, having a circular periphery 12 and a central aperture 13. The latter constitutes a means for mounting the hub 11 on the drive shaft of a rotary trimmer. Inasmuch as rotary trimmers of the type of which this invention is concerned are well known and include drive shafts, it is deemed unnecessary to encumber the drawings and specification with an illustration and description of the trimmer and its rotary shaft. Drive shafts for trimmers ordinarily come in two diametric sizes. To adapt the hub 11 for mounting on drive shafts of two different diameters, a bushing 14 is removably positioned in aperture 13.

Three cutting blades 15, 16 and 17 are formed integrally with hub 11 and are substantially co-planar therewith. They are equiangularly spaced about hub 11 from which they outstand. Moreover, hub 11 and blades 15, 16 and 17 are of a flexible elastomeric material 18 such as rubber which is the preferred embodiment is reinforced by plastic fibers. In addition, a layer of a coarse fabric 19 is embedded in material 18 as can be seen in FIGS. 3, 4, and 5. As these blades 15, 16 and 17 are all alike, only one of them is herein described in detail. Thus, blade 16 has a comparatively long convex cutting edge 20, the inner portion of which is tangential to the peripherly 12 of hub 11, as shown at 21. The opposite side of blade 16 is formed with a relatively short straight cutting edge 22.

In one embodiment, cutting edges 20 and 22 are defined by bevelled surfaces 23 and 24, which are substantially parallel to one another as illustrated in FIG. 4. In the modified embodiment of FIG. 5, they are defined by bevelled surfaces 25 and 26, which converge and as illustrated in FIG. 5, cooperate with the body of blade 16 to define a substantially frustoconical blade structure.

Trimmers of different sizes require blades of various length. As produced by the manufacturers, they will all be of the same standard length as shown in FIG. 2. However, each cutting blade 15, 16 and 17, is provided with lines 27 in the region adjacent to its outer end to define sections 28, any of which may be removed by cutting off along line 27.

In the preferred embodiment, elastomeric material 18 is a rubber to which has been added fibers of an organic polymer such as nylon with the fibers constituting from 45 to 60% of the weight of the rubber fiber mixture. To minimize cost, the rubber can be reclaimed rubber from scrapped tires, for example. Such reclaimed rubber will contain up to 40% by weight of nylon fibers when the tire from which the rubber is reclaimed have nylon cord. The maximum length of the fibers is substantially one-half inch. Such fibers reclaimed from such tires can be added back into the mixture to bring the proportion of rubber to nylon fiber into the desired range.

Fabric 19 is woven from coarse, or large threads, of an organic polymer such as nylon in the preferred embodiment which has the desired properties of resiliency, tensile strength, and resistance to wear needed to produce a safety cutter blade for a rotary trimmer. In the preferred embodiment the threads are 0.035 inches in diameter and the warp has from 20-25 such threads per inch and the woof from 10-15 threads per inch. A commercially available fabric which meets these specifications is made by the B. F. Goodrich Industrial Products Company and is identified as GR 953 Nylon Fabric.

In fabricating blade 10, a layer of elastomeric material 18 is placed in an appropriately designed mold, a layer of fabric 19 is placed in the mold overlying the first layer and the balance of the mold is filled with material 18 overlying the layer of fabric. Fabric 19 is generally positioned in the middle, or the thickness of material 18 on either side of fabric 19 is generally equal except at the cutting edges of cutting blades 15, 16 and 17 as illustrated in FIGS. 4, 5 and 6. Fabric 19 is preferably cut from one piece of material and has a shape and size substantially equal to or coextensive with the size and shape of the blade 10 in plan view. Fabric 19 is positioned so that it intersects or forms the cutting edges 20, 22 of the cutting blades 15, 16 and 17 as seen in FIGS. 4 and 5. Heat and pressure are applied to the contents of the mold to vulcanize them to produce blade 10.

While the manner in which safety blade 10 operates is believed to be obvious from the illustrations and descriptions set forth above, in operation, blade 10 is mounted on the drive shaft of a conventional trimmer which generally rotates in only one direction. The direction of rotation is generally clockwise as indicated by arrow 29 in FIG. 2. If blade 10 is positioned on the drive shaft so that straight cutting edge 22 is the leading cutting edge of cutting blades 15, 16 and 17 as illustrated in FIG. 2, the surface 30 of cutting blades 15, 16 and 17 will be the top surface and surface 31 will be the bottom.

Cutting edges 22 are swept forward when they are the leading edge since a radius 32 through tip 33 of cutting edge 22 precedes or leads cutting edge 22 when it is the leading edge. Convex cutting edges 20 are swept, or swept rearwardly, when cutting edge 20 is the leading edge since radius 34 through the tip 35 of cutting edge 20 always trails cutting edge 20 when it is the leading edge. When cutting edge 22 is the leading edge, grass severed by the cutting blades 15, 16 and 17 will have a component of force directed inwardly toward the center of blade 10. Since cutting edges 22 are optimized for cutting short grass, the short grass will not become wound around the shaft on which blade 10 is mounted and thus will not impede the operation of the trimmer.

If long grass or high weeds are to be cut, blade 10 is removed and inverted and remounted on the drive shaft of the trimmer with convex swept cutting edges 20 as the leading edges of blades 15, 16 and 17. Severed portions of grass or weeds cut by swept cutting edges 20 will have imported to them a component of velocity away from the center of blade 10 which minimizes the risk of such severed materials becoming wrapped around the drive shaft and stalling the motor of the trimmer.

The presence of fabric 19 resists elongation of blades 15, 16 and 17 in operation due to centrifugal force and resist deflection of the blade due to the forces applied to them in cutting plants such as grass, weeds, etc. The presence of fabric 19 at the cutting edge makes the cutting more effective comparable to that achieved by metal blades and resists rapid abrasion or erosion of the cutting edges 20, 22. Because the heavy nylon thread in fabric 19 has greater resistance to abrasion, the cutting edges are ablated more slowly then elastomeric material 18 with the result that the cutting edges are self-sharpening. The presence of reinforcing fibers in elastomeric material 18 also tends to increase the resistance of the blade to elongation, to deflection and increases its resistance to wear which supplements the effects of the fabric 19 so that a single layer of fabric 19 is all that is needed to produce a blade having comparable qualities to one having multiple layers of fabric incorporated in it.

The cutting edges 20, 22 define cutting edge planes. In the preferred embodiment illustrated in FIGS. 2 and 4, two cutting edge planes are defined by the cutting edges 20, 22 which are parallel to each other and spaced apart a distance substantially equal to the thickness of a cutting blade such as 16. In the modification illustrated in FIG. 5, the cutting edges 20, 22 define or lie in the same cutting edge plane. When the blade 10 is mounted on the drive shaft of a trimmer, the cutting edge planes defined by the cutting edges 20, 22 substantially lie in a plane of rotation about the axis of rotation of the drive shaft.

While preferred and specific embodiments of the invention are hereabove set forth, it should be evident that various modifications can be made to the described embodiments without departing from the scope of the present invention.

What is claimed:

1. A safety blade for a rotary trimmer having a drive shaft adapted to be rotated about an axis of rotation in one direction, said blades comprising:
   a central hub;
   means on said hub for mounting the blade on a drive shaft for rotation with the drive shaft;
   a plurality of cutting blades integral with said hub and extending outwardly therefrom in equally angularly spaced relation, each cutting blade having two sides and having a swept backward cutting edge formed on one side and a swept forward cutting edge on the other, said cutting edges substantially defining a cutting edge plane;
   said hub and blades being formed of an elastomeric material with a layer of coarse fabric made of an organic polymer embedded in said elastomeric material and co-extensive with each blade, said layer of fabric being positioned to intersect the cutting edges of each cutting blade;
   whereby when the blade is mounted on a drive shaft in one position, the swept backward cutting edge of each blade which is adapted for cutting tall plants is in cutting position and the blade applies an outwardly directed force against the plants to be cut so that the severed portions of such plants are thrown outwardly away from the drive shaft; and
   when the blade is mounted in its other position, the swept forward cutting edge of each blade which is adapted to cut short grass is in cutting position.

2. The safety blade of claim 1 in which there are three cutting blades.

3. The safety blade of claim 2 in which the swept backward cutting edge is a convex curve substantially tangent to the hub.

4. The safety blade of claim 3 in which the swept forward cutting edge is substantially a straight line.

5. The safety blade of claim 4 in which the cutting edge plane lies in a plane of rotation about the drive shaft on which the blade is adapted to be mounted.

6. The safety blade of claim 4 in which the swept backward cutting edges define one cutting edge plane and the swept forward cutting edges define a second cutting edge plane, both of which cutting edge planes lie in planes of rotation about a drive shaft on which the blade is adapted to be mounted.

7. The safety blade of claim 1 in which the elastomeric material includes fibers of an organic polymer which fibers are substantially uniformly distributed throughout the elastomeric material and are randomly oriented.

8. The safety blade of claim 7 in which the elastomeric material is a rubber.

9. The safety blade of claim 8 in which the organic polymer is a nylon.

10. The safey blade of claim 9 in which the fibers constitute from 45 to 60% of the weight of the material and the maximum length of the fiber is substantially one-half inch.

11. The safety blade of claim 1 in which the coarse fabric is a single contiguous piece of fabric having a shape and size corresponding to the dimension of the blade in the plane defined by the cutting edges of the blades.

12. The safety blade of claim 11 in which the organic polymer of the fabric is a nylon.

13. The safety blade of claim 12 in which the threads of the fabric are substantially 0.035 inches in diameter.

14. The safety blade of claim 13 in which the warp threads number in the range of from 20-25 threads per inch and the woof threads number in the range of from 10-15 threads per inch.

* * * * *